United States Patent [19]
Kroll et al.

[11] Patent Number: 5,361,802
[45] Date of Patent: Nov. 8, 1994

[54] VALVE BLOCK

[75] Inventors: Dieter Kroll, Fellbach; Jürgen Weber, Weinstadt, both of Germany

[73] Assignee: Herion-Werke KG, Germany

[21] Appl. No.: 950,396

[22] Filed: Sep. 23, 1992

[30] Foreign Application Priority Data

Sep. 30, 1991 [DE] Germany ............................ 4132541

[51] Int. Cl.$^5$ .......................................... F16K 37/00
[52] U.S. Cl. .................................... 137/552; 137/883; 137/884; 251/129.17; 251/367
[58] Field of Search ............... 137/551, 552, 312, 883, 137/884; 251/129.17, 367

[56] References Cited

U.S. PATENT DOCUMENTS

| | | | |
|---|---|---|---|
| 3,480,040 | 11/1969 | Erickson | 137/883 |
| 4,175,590 | 11/1979 | Grandclement | 137/883 |
| 4,230,143 | 10/1980 | Dettmann et al. | 137/884 |
| 4,768,559 | 9/1988 | Hehl | 251/367 |
| 4,901,751 | 2/1990 | Story et al. | 137/312 |

FOREIGN PATENT DOCUMENTS 2725224 12/1978 Germany ............................ 137/551

Primary Examiner—A. Michael Chambers
Attorney, Agent, or Firm—Henry M. Feiereisen

[57] ABSTRACT

A valve block, in particular for aggressive fluids and/or fluids of increased temperature, includes a plurality of valve cartridges and an adapter for attachment of the plurality of valve cartridges. The adapter includes passageways for communication with each individual valve cartridge. The adapter is made of plastic material through an injection molding process and includes fittings for attachment of hoses, with the fittings being injection molded and fixed to the adapter through ultrasonic welding. At a location before and behind each valve cartridge are metallic electrodes fitted in the adapter and electrically connected to an analyzer so as to form an electric circuit which is closed by the electrically conductive fluid in order to allow each valve cartridge to be monitored for leaks.

13 Claims, 2 Drawing Sheets

VALVE BLOCK

BACKGROUND OF THE INVENTION

The present invention refers to a valve block, and in particular to a valve block for aggressive fluids and/or fluids at increased temperature.

In the biotechnological field, pharmaceutical field or medical field, the use of diaphragm valves made of plastic material is frequently proposed to meet standards with regard to chemical and thermal resistance. The provision of a suitable fluidic control with several valves which communicate with each other and are combined to form a valve block requires a connection of the individual valves to each other via hoses or tubes. Such a design results in a complicated assembly and pipe work and in numerous joints which increase the risk of leakages. Also, problems have been encountered with regard to temperature resistance especially when it comes to thermal sterilization.

It was also proposed to machine not only the plurality of valves or valve seats in the valve block but also the passageways via which the valves communicate with each other. Even though the number of joints or connections is reduced thereby, the machining process is still complicated and results in increased use of material and thus in a high weight. Moreover, the provision of integrated valve seats leads to increased amount of scrap, and a malfunction of a single valve requires replacement of the entire valve block. This is not only time consuming but results also in high costs for spare parts.

SUMMARY OF THE INVENTION

It is thus an object of the present invention to provide an improved valve block obviating the afore-stated drawbacks.

In particular, it is an object of the present invention to provide an improved valve block which is easy to manufacture and allows the valves to be individually installed and removed as well as individually checked.

These objects and others which will become apparent hereinafter are attained in accordance with the present invention by providing a valve block which includes a plurality of valves and an adapter which accommodates passageways for connecting the individual valves with each other.

Preferably, the adapter is made of plastic material, with the passageways being made e.g. through injection molding. The adapter is suitably provided with fittings for attachment of hoses, with the fittings being made through injection molding and fixed to the adapter through ultrasonic welding.

According to another feature of the present invention, the adapter is provided in flow direction of the fluid with a first metallic electrode at a location before each valve and with a second metallic electrode at a location behind each valve. Both metallic electrodes are electrically connected to an analyzer, with the electric circuit being closable by the electrically conductive fluid.

At operation, when the valves occupy their closed position, the circuit is interrupted. However, if one of the valves does not properly close, fluid leaks by which the circuit is closed to trigger for example an alarm. In this manner, the defective valve can easily be detected and replaced. The electrodes serve as detectors and the analyzer monitors the electric current conduction.

Each of the valves can be supplied as a complete pre-assembled and checked valve unit—called valve cartridge—comprised of valve seat and closing element, with each valve cartridge being individually mounted to and removed from the adapter.

Each valve cartridge includes an electromagnetically operated armature which is connected to the closing element and a stationary counterarmature, with one end of the counterarmature which is remote to the closing element being provided with a metallic electrode. This electrode is also electrically connected to the analyzer so as to form with one metallic electrode in the adapter an electric circuit which is closable by the electrically conductive fluid. In this manner, the dead space of the armature can be monitored for possible leakages due to possible cracks in the closing element of the valve because the electric current is closed by leaking fluid. Suitably, when the circuit is closed by leaking fluid, a respective signal is generated which may trigger an alarm.

The electrode is suitably designed in form of a metal pin which is injection molded in an electrode carrier of plastic material, with the electrode carrier being attached to the counterarmature by means of a snap-in hook connection and simultaneously serving for axial fixation of the electromagnet for the armature.

Each valve cartridge can easily be installed and removed and separately replaced so that shorter maintenance periods and lower costs for spare parts are attained. Since each valve cartridge can be individually checked, a check of the entire valve block becomes considerably simplified for the manufacturer. The valve cartridge has versatile application and can be attached to other adapters at respective assembly dimensions.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
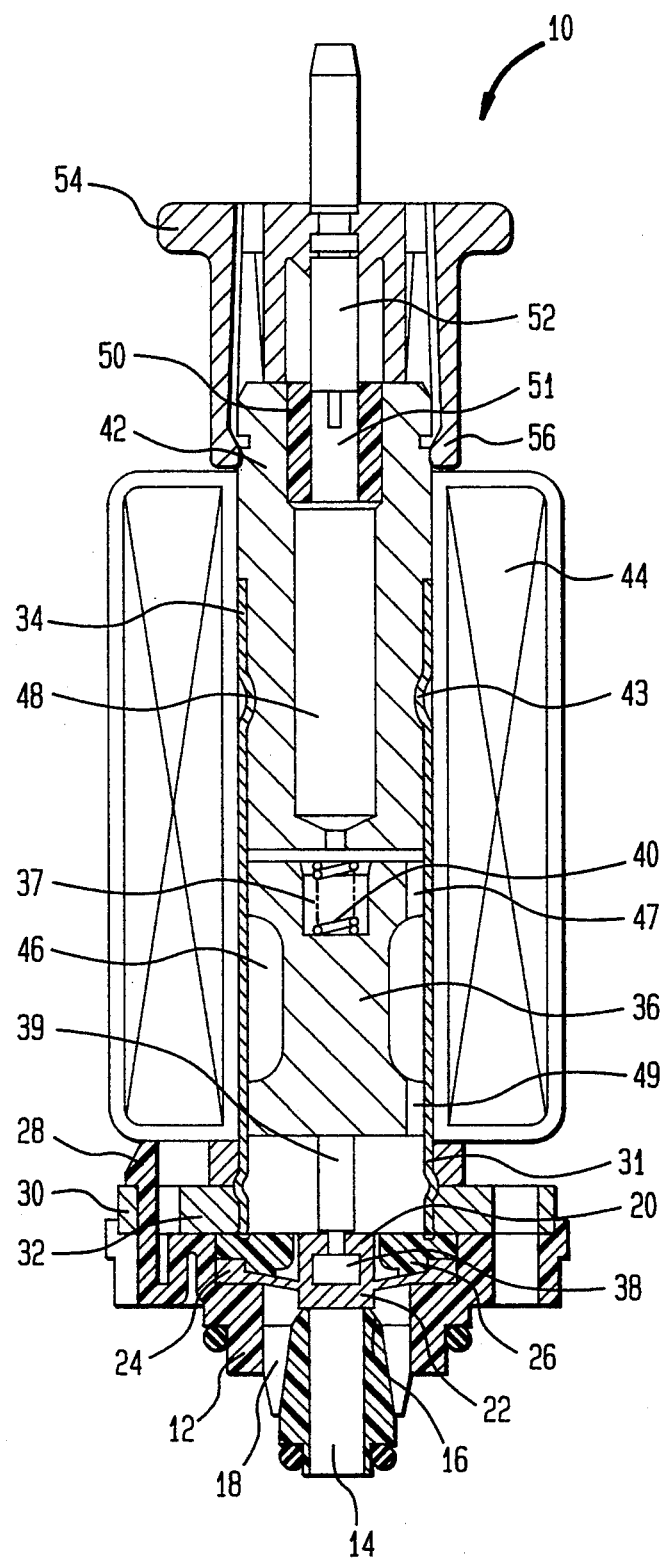
FIG. 1 shows a schematic sectional view of one embodiment of a valve cartridge in accordance with the present invention.

Throughout all the Figures, the same or corresponding elements are always indicated by the same reference numerals.

Referring now to the drawing and in particular to FIG. 1, there is shown a schematic sectional view of a valve cartridge in accordance with the present invention, generally designated by reference numeral 10. The valve cartridge 10 includes a housing 12 which is made of nonconducting material e.g. plastic material and is provided with an inlet 14, a valve seat 16 and an outlet 18. The valve seat 16 is controlled by a valve element in form of a diaphragm, generally designated by reference numeral 20. The diaphragm 20 is provided with a plug 22 of essentially U-shaped configuration by which the valve seat 16 is closed and opened and which includes an inner generally rectangular space. Radially extending from the plug 22 of the diaphragm 20 is a circumferential annular extension which includes a peripheral enlargement 24 sandwiched between a shoulder of the housing 12 and a retainer ring 26 which is also made of plastic material.

Evenly spaced about the housing 12 are three snap-in hooks 28 (only one is shown in FIG. 1) which traverse suitable bores of a base plate 30 to hook upon the upper surface thereof. The housing 12 bears upon the bottom surface 32 of the base plate 30 to thereby provide a form-fitting connection between the base plate 30 and the housing 12.

Fixedly secured to the base plate 30 by means of suitable crimps or beads 31 is a magnetic sleeve 34 in which a magnetic armature 36 is guided for axial displacement. The armature 36 is provided with a central necking to define an annular space 46. At its diaphragm-near end, the armature 36 is axially extended by a tappet 39, with its head 38 being embedded in the inner rectangular space of the plug 22 of the diaphragm 20 to attain a form-fitting connection between the armature 36 and the diaphragm 20. At its diaphragm-distant end, the armature 36 is provided with a blind bore 37 in which one end of a compression spring 40 is received, with the other end thereof bearing upon a stationary counterarmature 42 so as to permanently urge the armature 36 and the diaphragm 20 against the valve seat 16 to close the latter. The counterarmature 42 is connected with the magnetic sleeve 34 in form-fitting manner by a crimp 43. Enclosing the armature 36, counterarmature 42 and magnetic sleeve 34 is an electromagnet 44 which is suitably connected to a not shown power source for actuating the armature 36 in a manner known per se.

When the electromagnet 44 is excited, the armature 36 is lifted against the force of the compression spring 40 so as to move the plug 22 of the diaphragm 20 off the valve seat 16 to thereby allow the fluid to flow from inlet 14 to outlet 18. The upward stroke of the armature 34 is limited by the counterarmature 42.

As further shown in FIG. 1, the counterarmature 42 is provided with a central bore 48 which is in communication with the annular space 46 via a bore 47 and receives at its upper diaphragm-distant end a sealing element in form of a bush 50 of plastic material. The bush 50 has a bore 51 which is in communication with the central bore 48 of the counterarmature 42, with an electrode 52 projecting from above into the bore 51. The electrode 52 is configured in form of a metal pin and mounted within an electrode carrier 54 of plastic material through injection molding. The electrode carrier 54 is attached to the upper end of the counterarmature 42 via a snap-in hook 56 and forms an abutment for the electromagnet 44 so that the latter is secured against an axial displacement along the magnetic sleeve 34.

Figure 2:
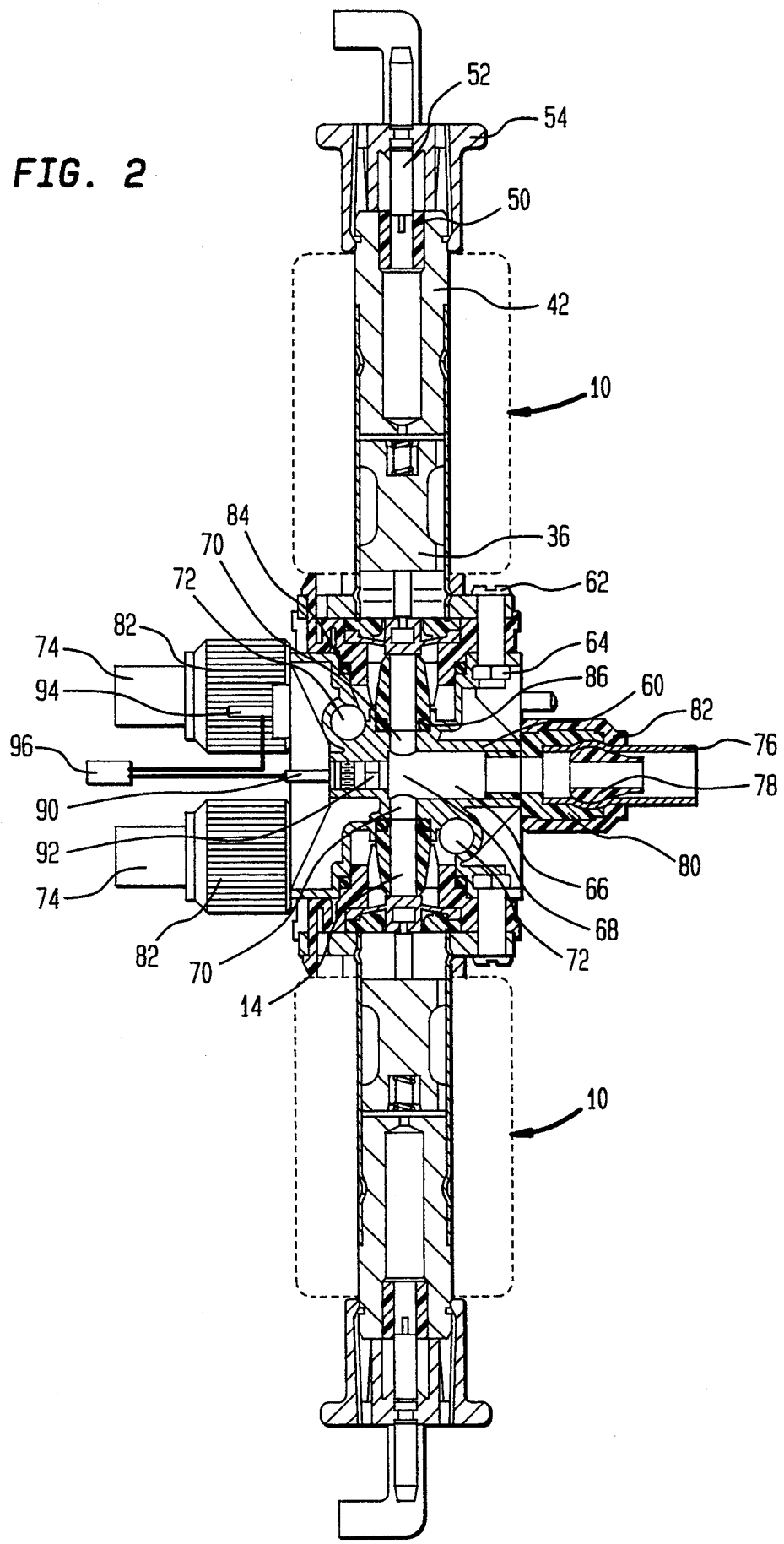
FIG. 2 shows a schematic sectional view of an adapter in accordance with the present invention and illustrating attachment of two valve cartridges according to FIG. 1.

Turning now to FIG. 2 there is shown a schematic sectional view of an adapter, generally designated by reference numeral 60 and provided for attachment by one or more valve cartridges 10 at each side thereof. Since the longitudinal direction of the adapter 60 extends transversely to the plane of projection of FIG. 2, only one upper and one lower valve cartridge 10 are illustrated in FIG. 2. Persons skilled in the art will understand that each side of the adapter 60 may include a number of sequentially arranged valve cartridges 10, for example five, so that such an assembled valve block includes the adapter 60 with ten individual valve cartridges 10.

As shown in FIG. 2, each valve cartridge 10 is connected to the adapter 60 by means of screws 62 and nuts 64 which are inserted through lateral bores 65 (FIG. 1) of the housing 12. The adapter 60 is made of nonconducting material e.g. plastic material and includes a fluid inlet channel 66 which communicates with a longitudinal channel 68 extending transversely to the plane of projection of FIG. 2 so that the inlet channel 66 and the channel 68 are generally configured in form of a T-shaped passageway. Branching off the channel 68 are channels 70 which lead to the inlet 14 of the respective valve cartridges 10, i.e. the inlet 14 of each valve cartridge 10 communicates with a pertaining channel 70. The outlet 18 of each valve cartridge 10 communicates with a pertaining outlet channel 72 which is connected to an outlet hose assembly 74.

The inlet channel 66 is connected to an inlet hose assembly 76 which has one end slid over a conical bush 78 which together with this hose end is inserted in a complementary, flared fitting 80 which in turn is connected to the adapter 60 by ultrasonic welding. A screw cap 82 is threadably engaged upon the fitting 80 to press the bush 78 against the fitting 80. In order to attain a proper sealing, suitable O-rings 84 and 86 are provided between each valve cartridge 10 and the adapter 60.

The adapter 60 is further provided with a central metallic electrode 90 which is embedded in the adapter 60 e.g. by means of ultrasonic welding in immediate proximity of the longitudinal channel 68. A O-ring 92 is sandwiched between the electrode 90 and the adapter 60 for compensating different heat expansion between the steel electrode 90 and the plastics adapter 60 to thereby provide a proper sealing.

Each valve cartridge 10 is further provided with a metallic electrode 94 which is also fitted in the adapter 60 and communicates with the outlet channel 72 of each valve cartridge 10. The electrode 94 can be mounted to the adapter 60 in a same manner as the electrode 90.

The electrodes 52, 90, 94 allow each individual valve cartridge 10 to be monitored for leakage. The central electrode 90 as well as the electrode 94 of each valve cartridge 10 are electrically connected to an analyzer 96. Thus, when the valves are open, the circuit is closed by the electric conductivity of the fluid flowing via the inlet channel 66 of the adapter 60 through channel 70, inlet 14, open valve seat 16, outlet 18 and outlet channel 72 of each valve. When the valve seat 16 of each valve cartridge 10 is closed by the plug 22, the electric circuit is interrupted. However, if for any reason, a valve cartridge 10 is defective and fails to properly seal, fluid leaks and thus closes the electric circuit between the central electrode 90 and the individual electrode 94. This generates a signal which is processed by the analyzer 96 to trigger e.g. an alarm to identify the defective valve cartridge for subsequent replacement.

In addition to monitoring the operativeness of each valve cartridge 10, the dead space of the armature may be checked for possible leakages which may be caused through cracks in the diaphragm 20. In this case, leaking fluid enters through inlet 14 and bore 49 into the annular space 46 and via bore 47 into the central bore 48 of the counterarmature 42 so that the dead space of the armature within the magnetic sleeve 34 is filled with working fluid which contacts the metallic electrode 52 and closes the circuit, for example the circuit between the electrodes 52 and 90. The analyzer 96 which is electrically connected to the electrodes 52, 90 generates a respective signal by which an alarm may be triggered.

As shown in FIG. 1, the electrode 52 snugly fits with one end into the bush 50 so that no fluid can penetrate the space above the bush 50.

Persons skilled in the art will understand that a monitoring of the valve cartridges for leakages requires the adapter 60 and those parts which contact the fluid to be made of nonconducting material e.g. plastic material while the fluid is electrically conductive.

The adapter and the fittings are made through injection molding and welded together by ultrasonic. The utilized plastic material should be highly temperature resistant. In comparison to machined valve blocks, the valve block according to the invention results in a compact, space-saving structure with hydrodynamically favorable design of the internal passageways. The selected plastic materials (PES or PEEK) are temperature-resistant to allow high thermal load and thermal sterilization of the valve block. The material consumption and the weight are considerably decreased and the quality with regard to geometry and surface quality remains uniform. The manufacturing costs can further be lowered through use of injection molding, and the electric monitoring system allows a highly safe application of the valve block.

While the invention has been illustrated and described as embodied in a valve block, it is not intended to be limited to the details shown since various modifications and structural changes may be made without departing in any way from the spirit of the present invention.

What is claimed as new and desired to be protected by Letters Patent is set forth in the appended claims:

We claim:

1. A valve block, in particular for aggressive fluids and/or fluids at increased temperature, comprising:
    a plurality of valve cartridges, each having a fluid inlet and a fluid outlet; and
    a separate adapter for attachment of and communication with said plurality of valve cartridges, said adapter having an inlet in communication with each said fluid inlet of said valve cartridges, outlet means in communication with each said fluid outlet of said valve cartridges, and fluid passageway means connecting said adapter outlet means with said adapter inlet.

2. A valve block as defined in claim 1 wherein said adapter is made of plastic material.

3. A valve block as defined in claim 1 wherein said adapter and said passageway means are injection molded.

4. A valve block as defined in claim 1 wherein said adapter is provided with fittings for attachment of hoses, said fittings being injection molded and fixed to said adapter by ultrasonic welding.

5. A valve block as defined in claim 1 wherein said adapter is provided with a first and a second metallic electrode respectively arranged before and behind each of said valve cartridges, and further comprising an analyzer electrically connected with said first and second metallic electrodes to define an electric circuit which is closable by the fluid.

6. A valve block as defined in claim 5 wherein each of said valve cartridges is a complete valve unit comprised of valve seat and closing element and including an electromagnetically operated armature which is connected to said closing element and with a stationary counterarmature having one end distant to said closing element, and further comprising a third metallic electrode arranged at said one end of said counterarmature and being electrically connected to said analyzer so as to form with said first metallic electrode a detector, with said first and third electrodes defining a circuit closable by the fluid.

7. A valve block as defined in claim 6, and further comprising an electromagnet for actuating said armature and an electrode carrier of plastic material, said third electrode being configured in the shape of a metal pin injection molded in said electrode carrier which includes a snap-in hook connection for attachment to said counterarmature and for axial fixation of said electromagnet.

8. A valve block as defined in claim 1 wherein each of said valve cartridges is a complete valve unit comprised of valve seat and closing element, with said valve cartridges being individually mounted to and removed from said adapter.

9. A valve block, in particular for aggressive fluids and/or fluids at increased temperature, comprising:
    at least one of valve cartridge having a fluid inlet and a fluid outlet;
    a separate adapter for attachment of said valve cartridge, said adapter having an inlet and an outlet, and fluid passageway means connecting said adapter outlet means with said adapter inlet, with said valve cartridge being arranged between said inlet and outlet for controlling the flow of fluid therethrough; and
    detecting means for monitoring fluid-tightness of said valve cartridge, said detecting means forming an electric circuit which is closable by leaking fluid.

10. A valve block as defined in claim 9 wherein said detecting means includes a first electrode provided at said inlet, a second electrode provided at said outlet and an analyzer which is electrically connected with said first and second electrodes so as to form a first such electric circuit which is closable by leaking fluid.

11. A valve block as defined in claim 10 wherein said detecting means further includes a third electrode provided in said valve cartridge and electrically connected to said analyzer, said first and third electrodes forming with said analyzer a second such electric circuit which is closable by leaking fluid.

12. A valve block as defined in claim 9 wherein said detecting means includes a first electrode provided at said inlet, a second electrode provided in said valve cartridge and an analyzer which is electrically connected with said first and second electrodes so as to form a second such electric circuit which is closable by leaking fluid.

13. A valve cartridge for connection to a separate adapter of a valve block; comprising:
    a housing having a fluid inlet and a fluid outlet;
    a valve means fitted in said housing for controlling the flow of a fluid from said inlet to said outlet; and
    detection means attached to said valve means and being part of an electric circuit which is closeable by a leaking fluid for monitoring fluid-tightness of said valve means and checking for a leak in said housing, said detection means including an electrode arranged said housing and cooperating with electrode means in the adapter to define said electric circuit.

* * * * *